Patented May 20, 1952

2,597,491

UNITED STATES PATENT OFFICE 2,597,491

ANION-EXCHANGE RESINS

Jesse C. H. Hwa, Philadelphia, Pa., assignor to Rohm & Haas Company, Philadelphia, Pa., a corporation of Delaware No Drawing. Application May 12, 1951, Serial No. 226,095

10 Claims. (Cl. 260—63)

This invention relates to new anion-exchange resins and to their preparation and use. It relates to nitrogenous resins which are insoluble in aqueous solutions of acids, bases, and salts and which are suitable for the repeated removal of anions from fluids.

The products of this invention are made by the reductive amination of a proliferous or popcorn polymer of methyl vinyl ketone. The process, which is described in greater detail below, comprises polymerizing methyl vinyl ketone to an insoluble, infusible, proliferous polymer, treating the proliferous polymer with ammonium formate, formamide, or with a mixture of formic acid and an amine, and then hydrolyzing the resultant intermediate formamido compound whereby amino groups are formed which occupy the positions formerly held by the keto-oxygen atoms in the polymeric ketone. Thus, a product is obtained which has anion-exchange properties and is characterized by having an exceptionally great surface-area.

The proliferous polymers of methyl vinyl ketone, from which the anion-exchange resins of this invention are made, are themselves prepared most conveniently by maintaining at a temperature from about 50° C. to 100° C.—and preferably from 60° C. to 80° C.—a mixture of methyl vinyl ketone and an auxiliary polyolefinic compound which is copolymerizable with the methyl vinyl ketone and in which the olefinic linkages are in the acylclic portion of the molecule and are the sole functional groups which take part in the copolymerization reaction. It is suggested that the copolymerization be carried out in a closed system where the amount of oxygen is negligible. It is even better to conduct the copolymerization in an inert atmosphere because oxygen exerts an inhibiting effect on the formation of the proliferous product. The addition of a small but catalytic amount of a perviously prepared proliferous polymer is also recommended since it serves as a seed from which the proliferous polymer grows rapidly.

Proliferous polymers or copolymers of methyl vinyl ketone are believed to be new, although other kinds of proliferous polymers have been known for some time. Thus Kondakow (J. prakt. Chim. [2] 64, p. 109 (1901)); Carothers (J. A. C. S. 53, p. 4203 (1931)); Staudinger et al. (Berichte 68, p. 1618 (1935)); Briton (U. S. Pat. 2,341,175 of February 8, 1944); Kharasch et al. (Ind. Eng. Chem. 39, p. 830 (1947)) and others have described various popcorn or proliferous polymers from other unsaturated, monomeric materials. Such popcorn polymers are distinct kinds of polymers and they have a community of physical properties. They are opaque, they have a sponge-like, porous structure, and they are insoluble in the very solvents which dissolve the homogeneous, thermoplastic polymers which are normally made from the same monomers. In most cases they look very much like popcorn and have been variously described as sponge-like, couliflower-like, and coral-like. They have extremely high molecular weights and are apparently cross-linked to some extent. In addition, they are formed by an auto-catalyzed polymerization and the characteristic way in which they form helps to identify them. In the process of preparing popcorn polymers the induction period may be long but once polymerization has started it proceeds rapidly until all or most of the monomer is consumed. It is characteristic of this type of polymerization that the polymer is insoluble in the monomeric material at all stages of the polymerization and that polymerization progresses in random directions with the formation of a branched or clustered, expanded or "popped" product. That is, polymerization progresses by proliferation with the rapid and repeated production of new parts; and for this reason the term "proliferous polymer," which has been applied to this kind of polymer and which is now synonymous with "popcorn polymer," is particularly apt—and is truly descriptive.

This invention relates primarily to the preparation of proliferous polymers of methyl vinyl ketone and to their conversion to anion-exchange resins which retain the physical properties of the proliferously polymerized methyl vinyl ketone from which they are made. This is not to say, however, that the conventional, non-proliferous, clear, cross-linked polymers of methyl vinyl ketone cannot also be converted to anion-exchange resins by reductive amination. They can be. But they do not give rise to resins with as large surface areas, or as rapid rates of adsorption, or as high capacities per unit of weight as are obtained from the proliferous polymers. As a matter of fact, some of the clear, non-proliferous polymer is frequently formed together with the proliferous polymer; and while this can be separated, it does not have to be, since it reacts chemically like the proliferous polymer and its presence merely dilutes, as it were, the advantages of the proliferous polymer.

In general, low temperatures favor the formation of proliferous polymers whereas higher temperatures favor the formation of the clear polymers. For this reason it is preferred that the polymerization of methyl vinyl ketone be carried out at temperatures from about 50° C. to 80° C. In this range the rate of formation of the proliferous polymer is fast enough to be practical while the formation of the clear, non-proliferous polymer is negligible—particularly in view of what was discussed above. At temperatures from 80° C. to 100° C. the proportion of clear polymer increases at the expense of the proliferous product and above 100° C. the clear product forms to the complete exclusion of the proliferous resin.

A wide variety of polyolefinic compounds, as described above, definitely assist in the formation of the popcorn polymers of methyl vinyl ketone. The auxiliary compounds function as popping agents—or as catalysts for proliferous polymerization. Examples of some of the best auxiliary agents include divinylbenzene, isoprene, butadiene, bimethallyl, biallyl, trivinylbenzene, dicyclopentadiene, and similar polyolefinic hydrocarbons. Also effective are other unsaturated compounds such as dimethallyl ether and sulfide, vinyl allyl ether and those unsaturated esters, such as diallyl maleate and 2-chloroallyl crotonate, which are disclosed in U. S. Patents Nos. 2,311,615 and 2,341,175. The auxiliary compounds copolymerize with the methyl vinyl ketone and consequently are present in the final copolymeric products.

It is evident that as the amount of the auxiliary compound is increased the number of carbonyl groups per unit of weight is necessarily reduced. And since the capacity of the final resin for adsorbing anions is proportional to the number of amino groups which have replaced the original carbonyl groups in the polymer, it is desirable to hold the amount of the copolymerizable auxiliary compound to a minimum. On the other hand, the use of an auxiliary polyolefinic compound does exert an advantageous effect upon the speed of polymerization and upon the character and uniformity of the popped polymer. The most satisfactory and suggested amounts of auxiliary compounds are from 2% to 30%, based on the total weight of this material and of the methyl vinyl ketone. The use of larger amounts has been studied but there does not appear to be any advantage in exceeding 30%—or even 20%—particularly when the ion-adsorbing capacity of the final product is considered.

The use of a seed to promote the proliferous polymerization is not necessary but is most desirable. The material which is used as a seed can have the same chemical composition as the proliferous polymer which it is desired to make or it can have a different chemical composition. A convenient method involves adding a small amount of a previous batch of proliferous polymer to subsequent mixtures of monomeric material which are to be popped. Even the quantities of one batch which may adhere to the equipment serve to seed subsequent batches. The word "seed" is used herein in the accepted chemical sense and itself indicates that the amount required is very small and that the material is insoluble in the reaction mixture. As little as about 0.001%, on a weight basis, is adequate.

Methyl vinyl ketone can be made to polymerize proliferously either in bulk or in solution. Although monomeric methyl vinyl ketone is miscible with water and most organic liquids, the proliferous polymer of methyl vinyl ketone is in all cases insoluble in such liquids and separates from the liquid as it is formed and is then readily removed by filtration.

It appears that free radicals, such as are provided by peroxidic compounds, play a part in the formation of the opaque, proliferous polymers, just as they do in the formation of clear, glass-like polymers. In proliferous polymerization, however, the amount of the peroxidic compounds, such as benzoyl, lauroyl, stearoyl peroxides, tert.-butyl hydroperoxide and the inorganic persalts, which can be tolerated is relatively very low and should not exceed 0.5% on a weight basis because large amounts of such compounds favor the formation of the clear, glass-like polymers at the expense of the opaque, proliferous polymers. In like manner, a steady and continuous source of oxygen is to be avoided. That is to say, oxygen should be eliminated and, although the amount of air which is normally present in a closed reaction vessel is not too objectionable, it can be replaced to good advantage by an inert gas such as nitrogen. Thus, it is most desirable to conduct the proliferous polymerization in the substantially complete absence of oxygen.

The proliferous polymers of methyl vinyl ketone are next subjected to reductive amination. Despite the chemical change which takes place—with the substitution of amino groups for the original keto-oxygen atoms in the polymer—the physical properties are not substantially changed. The aminated products retain the characteristics which are so typical of proliferous polymers; namely, insolubility, low density, and extraordinarily high surface area.

The formation of the aminated products which have ion-exchange properties involves forming an intermediate formamido derivative of the proliferous polymer and then hydrolyzing this to an amino derivative. In the first step ammonium formate or formamide or a mixture of a primary amine and formic acid is employed and is reacted with the proliferous polymer of methyl vinyl ketone at a temperature from about 150° C. to the boiling point of the mixture and preferably from 160° C. to 210° C. It is recommended that the reaction be carried out at the lowest temperature that gives rise to the desired product.

Reaction takes place at the keto-oxygen atoms in the polymer and is believed to occur according to the following representation in which the formula

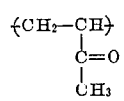

designates one unit of a polymer of methyl vinyl ketone and RNH₂ designates a primary amine which contains only carbon, hydrogen, and nitrogen and in which the sole functional groups are amino groups:

I.

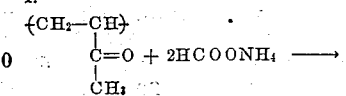

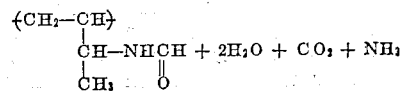

II.

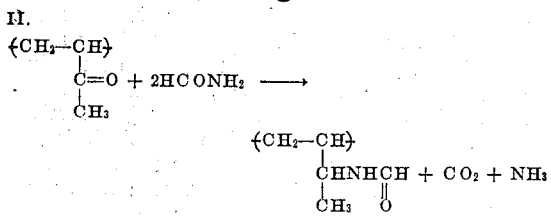

III.

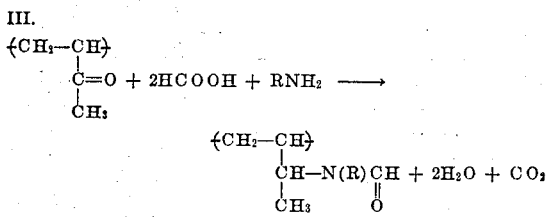

A wide variety of primary amines can be used in conjunction with the formic acid for reaction with the methyl vinyl ketone. The amines can be added as free bases or as salts since in reality a mixture of an amine and formic acid contains the amine salt. Furthermore, the formamide of the amine (HCONHR) is the full equivalent of a mixture of formic acid and amine for purposes of this invention since the formamide is formed from the acid and amine as the temperature is raised during the reaction with the polymer. The simplest class of operable amines are those in which a mono-valent hydrocarbon group; e. g., and alkyl or aryl group, is attached to the —NH₂ group. Typical of these primary amines are methyl, ethyl, isopropyl, n-butyl, iso-butyl, sec.-butyl, tert.-butyl, tert.-amyl, cyclohexyl, lauryl, and octadecyl amines and the isomers and homologues thereof, as well as aniline and naphthyl amines. It should be noted, however, that as the molecular weight of the group represented by R in the above general formula for the amine increases, as from methyl to lauryl for example, the percentage of amino-nitrogen in the intermediate formamido compound—and in the final product too—decreases. And since the capacity of the final product per unit of weight is proportional to the amount of amino-nitrogen which it contains, it is evident that the best products are those in which the group represented by R is small. Therefore, of all the operable mon-amines, it is preferred to use methylamine or ethylamine.

On the other hand, polyamines, such as ethylenediamine and propylenediamine, and the polyalkylenepolyamines, particularly polyethylenepolyamines, represent classes of amines which are preferred because they also contain a high proportion of amino-nitrogen. Diethylenetriamine, triethylenetetramine and tetraethylenepentamine are typical of such suitable polyamines. All of these fall within the group of primary amines which contain only carbon, hydrogen, and nitrogen and in which the sole functional groups are amino groups.

In the reaction, an excess of any reagent can be used, particularly since the insoluble polymeric materials can be easily purified by washing or extraction. It is, however, recommended that an excess of the formic acid derivatives be used in order to insure sufficient reaction since the capacity of the final resin depends upon the number of keto-groups which are converted first into formamido groups and then into amino groups. In order that the final products have reasonably high capacity at least 15% of the keto-oxygen groups should be converted into formamido groups, as described above, and then into amine groups which are the anion-adsorbing groups in the finished product. The reaction which results in the formation of the formamido compounds is facilitated if the polymer is first swollen in an organic solvent such as benzene, toluene, ethylene dichloride—or preferably in a water-miscible solvent such as dioxane or ethyl alcohol.

The intermediate formamido polymers are converted to amino polymers by hydrolysis with acids. An excess of an aqueous solution of a strong mineral acid such as hydrochloric or sulfuric acid is employed. The formamido polymer is suspended in aqueous acid solution and the mixture is heated—preferably to boiling. The formamido group alone is hydrolyzed to an amino group. Thus, the products of hydrolysis of the formamido polymers shown in Equations I and II above contain units having the structure

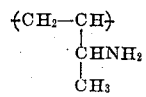

while the product of hydrolysis of the formamido polymer shown in Equation III contains units having this structure:—

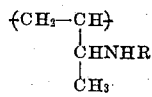

The products of this invention are anion-exchange resins of the weakly basic type by virtue of the presence in their structure of amino groups. They are also proliferous polymers and consequently have unusually large surface-areas which make for very rapid rates of adsorption.

The following examples, in which all parts are by weight, serve to illustrate the manner in which anion-exchange resins of this invention are prepared.

*Example 1*

A mixture of 21 parts of an 85% aqueous solution of methyl vinyl ketone and two parts of commercial divinylbenzene (containing approximately 44% divinylbenzene and 56% ethylstyrene) was placed in a flask. A seed of a proliferous polymer of 90% styrene and 10% butadiene was added and nitrogen was bubbled through the mixture in order to remove oxygen. The flask was sealed and placed in an oven held at 65° C. After an induction period of about one day a proliferous polymer began to form and at the end of six hours the polymer was removed and was digested in boiling dioxane in order to free it of any occluded water or monomer. Sixteen parts, representing an 80% yield, of hard, opaque, proliferous polyvinyl methyl ketone was obtained. This contained less than one per cent of the clear polymer.

In a similar way mixtures of methyl vinyl ketone containing respectively 10% butadiene and 5% commercial divinylbenzene, 15% isoprene, 10% bimethallyl, and 10% butadiene were converted into proliferous polymers.

*Example 2*

The proliferous polymer of methyl vinyl ketone and divinylbenzene prepared by the process of Example 1 above was converted into a formamido compound as follows: 14.8 parts of the polymer (equivalent to 0.19 mole of methyl vinyl ketone) was mixed with 100 parts of dioxane and was heated to boiling during which time the resin swelled to about 1.6 times its original volume. The swollen polymer was removed by filtration and was mixed with 75 parts of ammonium formate in a flask equipped with a mechanical stirrer, a thermometer, and a condenser. This stirred mixture was heated to 163° C. in one hour and then to 202° C. over a period of three more hours. The resultant product was cooled, washed thoroughly with water, and was dried. Analysis showed it to contain 7.6% nitrogen as against a theoretical value of 13.1% nitrogen for complete conversion of the carbonyl groups to —CHNHCHO groups, indicating that over one-half of the carbonyl groups had reacted to form formamido groups.

The formamido polymer, thus prepared, was boiled in 70 parts of 37% hydrochloric acid for two hours. The polymer was then cooled, separated by filtration, washed thoroughly with water, and was dried. It had a nitrogen-content of 6.1% and was in the form of the hydrochloric acid salt.

The resin was washed with an excess of a 4% solution of sodium hydroxide in order to convert it to the form of the free base and was then washed free of caustic with water. The product was treated with a standard solution of hydrochloric acid and was found to have an adsorption capacity of 4.3 milliequivalents per gram.

*Example 3*

The general procedure of Example 2 was followed in this case. A mixture was made of 102 parts of a 90% aqueous solution of formic acid, 146 parts of triethylenetetramine, and 14.8 parts of a proliferous polymer of methyl vinyl ketone and divinylbenzene which had been made by the process of Example 1 above and had been swollen in dioxane. The stirred mixture was heated gradually in one hour to 203° C. and was held at 203° C. for seven hours. The resin was then separated, washed, and dried. It had a nitrogen-content of 12.4%. Next, the resin was boiled in 200 parts of 37% hydrochloric acid for five hours after which it was washed with water, treated with an excess of a 4% solution of sodium hydroxide and again washed thoroughly with water. The product in the form of the free amine had a capacity for adsorbing acids of 4.71 milliequivalents per gram.

In a similar manner, proliferous copolymers of methyl vinyl ketone and butadiene, isoprene or bimethallyl were converted to formamido compounds by reaction with the formic acid salt of the following amines: methylamine, ethylamine, ethylenediamine, diethylenetriamine, and tetraethylenepentamine. The resultant formamido compounds were then hydrolyzed to anion-exchange resins. All of the resins, as is characteristic of the products of this invention, had large surface-areas and displayed rapid rates of adsorption.

The products described herein are of the type known as weakly basic anion-exchange resins. Thus, they adsorb acids from fluids and can be used batchwise or in continuous column operation. When exhausted, they are readily regenerated by treatment with a basic solution such as an aqueous solution of sodium hydroxide, after which they are in condition to adsorb more acid. They do not, however, split neutral salts, such as sodium hydroxide, to any great extent.

I claim:

1. A process for the preparation of anion-exchange resins which comprises first forming a proliferous copolymer of methyl vinyl ketone containing from 70% to 98% methyl vinyl ketone by proliferously polymerizing, at a temperature from 50° C. to 80° C. in the substantially complete absence of oxygen, a mixture of methyl vinyl ketone and an auxiliary, polyolefinic compound which is copolymerizable with methyl vinyl ketone and in which the olefinic linkages are in the acyclic portion of the molecule and are the sole functional groups which take part in the copolymerization reaction; converting at least 15% of the keto-oxygen atoms of said copolymer of methyl vinyl ketone into formamido groups by reacting said copolymer with a reagent from the class consisting of ammonium formate, formamide, and mixtures of formic acid and a primary amine which contains only carbon, hydrogen, and nitrogen and in which the sole functional groups are amino groups, at a temperature from 150° C. to the boiling point of the reaction mixture; then converting said formamido groups in the resultant copolymer to amino groups by hydrolyzing the copolymer containing formamido groups by means of an aqueous solution of a strong mineral acid; and thereafter isolating the resultant, anion-exchange resin.

2. A process for the preparation of anion-exchange resins which comprises first forming a proliferous copolymer of methyl vinyl ketone containing from 70% to 98% methyl vinyl ketone by proliferously polymerizing, at a temperature from 50° C. to 80° C. in the substantially complete absence of oxygen, a mixture of methyl vinyl ketone and an auxiliary, polyolefinic compound which is copolymerizable with methyl vinyl ketone and in which the olefinic linkages are in the acyclic portion of the molecule and are the sole functional groups which take part in the copolymerization reaction; converting at least 15% of the keto-oxygen atoms of said copolymer of methyl vinyl ketone into formamido groups by reacting said copolymer with ammonium formate at a temperature from 150° C. to the boiling point of the reaction mixture; then converting said formamido groups in the resultant copolymer to amino groups by hydrolyzing the copolymer containing formamido groups by means of an aqueous solution of a strong mineral acid; and thereafter isolating the resultant, anion-exchange resin.

3. A process for the preparation of anion-exchange resins which comprises first forming a proliferous copolymer of methyl vinyl ketone containing from 70% to 98% methyl vinyl ketone by proliferously polymerizing, at a temperature from 50° C. to 80° C. in the substantially complete absence of oxygen, a mixture of methyl vinyl ketone and an auxiliary, polyolefinic compound which is copolymerizable with methyl vinyl ketone and in which the olefinic linkages are in the acyclic portion of the molecule and are the sole functional groups which take part in the copolymerization reaction; converting at least 15% of the keto-oxygen atoms of said copolymer of methyl vinyl ketone into formamido groups by reacting said copolymer with formamide at a temperature from 150° C. to the boiling point of the reaction mixture; then converting said formamido groups in the resultant copolymer to amino groups by hydrolyzing the copolymer containing formamido groups by means of an aqueous solution of a strong mineral acid; and thereafter isolating the resultant, anion-exchange resin.

4. A process for the preparation of anion-exchange resins which comprises first forming a proliferous copolymer of methyl vinyl ketone containing from 70% to 98% methyl vinyl ketone by proliferously polymerizing, at a temperature from 50° C. to 80° C. in the substantially complete absence of oxygen, a mixture of methyl vinyl ketone and an auxiliary, polyolefinic compound which is copolymerizable with methyl vinyl ketone and in which the olefinic linkages are in the acyclic portion of the molecule and are the sole functional groups which take part in the copolymerization reaction; converting at least 15% of the keto-oxygen atoms of said copolymer of methyl vinyl ketone into formamido groups by reacting said coploymer with a mixture of formic acid and diethylenetriamine at a temperature from 150° C. to the boiling point of the reaction mixture; then converting said formamido groups in the resultant copolymer to amino groups by hydrolyzing the copolymer containing formamido groups by means of an aqueous solution of a strong mineral acid; and thereafter isolating the resultant anion-exchange resin.

5. A process for the preparation of anion-exchange resins which comprises first forming a proliferous coploymer of methyl vinyl ketone containing from 70% to 98% methyl vinyl ketone by proliferously polymerizing, at a temperature from 50° C. to 80° C. in the substantially complete absence of oxygen, a mixture of methyl vinyl ketone and an auxiliary, polyolefinic compound which is copolymerizable with methyl vinyl ketone and in which the olefinic linkages are in the acyclic portion of the molecule and are the sole functional groups which take part in the copolymerization reaction; converting at least 15% of the keto-oxygen atoms of said copolymer of methyl vinyl ketone into formamido groups by reacting said copolymer with a mixture of formic acid and triethylenetetramine at a temperature from 150° C. to the boiling point of the reaction mixture; then converting said formamido groups in the resultant copolymer to amino groups by hydrolyzing the copolymer containing formamido groups by means of an aqueous solution of a strong mineral acid; and thereafter isolating the resultant, anion-exchange resin.

6. An anion-exchange resin which is the product prepared by the process of claim 1.

7. An anion-exchange resin which is the product prepared by the process of claim 2.

8. An anion-exchange resin which is the product prepared by the process of claim 3.

9. An anion-exchange resin which is the product prepared by the process of claim 4.

10. An anion-exchange resin which is the product prepared by the process of claim 5.

JESSE C. H. HWA.

No references cited.